United States Patent
Hasegawa et al.

(10) Patent No.: US 6,239,205 B1
(45) Date of Patent: May 29, 2001

(54) SILICONE RUBBER COMPOSITION

(75) Inventors: Chiichiro Hasegawa; Junsuke Tokimatsu, both of Fukui Prefecture; Kazuhito Fujiwara, Hyogo Prefecture, all of (JP)

(73) Assignee: Dow Corning Toray Silicone Co., Tokyo (JP)

( * ) Notice: Subject to any disclaimer, the term of this patent is extended or adjusted under 35 U.S.C. 154(b) by 0 days.

(21) Appl. No.: 09/461,300

(22) Filed: Dec. 15, 1999

(30) Foreign Application Priority Data

Jan. 28, 1999 (JP) .................................................. 11-019443

(51) Int. Cl.$^7$ ....................................................... C08K 3/10
(52) U.S. Cl. ............................ 524/403; 525/430; 525/588
(58) Field of Search ................................... 524/403, 430, 524/588

(56) References Cited

U.S. PATENT DOCUMENTS

| | | | |
|---|---|---|---|
| 3,142,655 | * 7/1964 | Bobear | 524/403 |
| 3,692,732 | * 9/1972 | Degen et al. | 524/403 |
| 4,025,485 | 5/1977 | Kodama et al. | 260/37 SB |
| 4,360,388 | 11/1982 | Nauroth et al. | 106/288 B |
| 4,366,278 | * 12/1982 | Hamada et al. | 524/210 |
| 5,543,450 | * 8/1996 | Takita et al. | 524/190 |

FOREIGN PATENT DOCUMENTS

| | | | |
|---|---|---|---|
| 0 347 349 | 12/1989 | (EP) | C08K/3/22 |
| 0 033 843 | 8/1991 | (EP) | C01B/33/20 |
| 1 538 432 | 1/1979 | (GB) | C08L/83/04 |
| 7-11010 | 1/1995 | (JP) . | |
| 07 081932 | 3/1995 | (JP) | B01J/23/10 |

* cited by examiner

Primary Examiner—Margaret G. Moore
(74) Attorney, Agent, or Firm—William F. Boley; Jennifer S. Warren

(57) ABSTRACT

A silicone rubber composition comprising about 0.05 to 10 wt % cerium oxide powder having a BET specific surface area not less than 80 m$^2$/g and a pH value measured of a 3 wt % aqueous dispersion thereof of about pH 2 to 5.5.

13 Claims, No Drawings

SILICONE RUBBER COMPOSITION

BACKGROUND OF INVENTION

The present invention relates to a silicone rubber composition superior in heat resistance, and, in particular, relates to a silicone rubber composition superior in storage stability during the silicone rubber base compound stage and, upon curing, is capable of producing silicone rubber that has a low degree of thermal degradation and is superior in heat resistance.

The technique of admixing cerium oxide powder into silicone rubber as a heat stabilizer is known in the art (for example, see Japanese Kokai (Unexamined) Patent Publication No. Sho 52(1977)-14654, Japanese Kokai (Unexamined) Patent Publication No. Sho 60(1985)-173050, and Japanese Kokai (Unexamined) Patent Publication No. Hei 07(1995)-11010). Incidentally, it is commonly believed that it is difficult to compound cerium oxide powder with silicone rubber compositions in a uniform manner. The term "silicone rubber compositions" here means silicone rubber compositions prepared in such a manner that a silicone rubber base compound is first made by mixing diorganopolysiloxane polymer, reinforcing fillers, and, if necessary, various additives used for improving the physical properties of the silicone rubber composition, and the silicone rubber base compound is then stored for future use, allowing for curing by admixing a curing agent at the time of molding articles from the silicone rubber. Compounding the cerium oxide powder with the silicone rubber composition in a uniform manner during the stage of silicone rubber base compound preparation presents certain difficulties, however. For example, the problem that arises when a cerium oxide powder with a large specific surface area and a small particle size is added and kneaded during the stage of silicone rubber base compound preparation is that heat is released and the viscosity of the silicone rubber base compound itself increases, resulting in gelling in severe cases. Furthermore, the problem is that silicone rubber base compounds with cerium oxide powder added thereto have inferior storage properties, and when stored over an extended period of time, their viscosity increases while their rollability characteristics decrease, with gelling occurring in severe cases.

As a result of in-depth investigations aimed at eliminating the above described problems the inventors arrived at the present invention by discovering that a silicone rubber base compound obtained by compounding a special cerium oxide powder is superior in storage stability and that, moreover, silicone rubber obtained by curing a silicone rubber composition produced by compounding a curing agent with the silicone rubber base compound having such a special cerium oxide powder compounded therewith exhibits a low degree of thermal degradation under high temperature conditions exceeding 200° C.

Namely, it is an object of the present invention to provide a silicone rubber composition that is capable of producing silicone rubber superior in storage stability during the silicone rubber base compound stage, and, upon curing, exhibiting a low degree of thermal degradation under high temperature conditions and is superior in heat resistance.

SUMMARY OF INVENTION

A silicone rubber composition characterized by comprising about 0.05 to 10 wt % cerium oxide powder having a BET specific surface area of not less than 80 m$^2$/g and a pH value measured of a 3 wt % aqueous dispersion thereof of about pH 2 to 5.5.

DESCRIPTION OF INVENTION

The silicone rubber composition of the present invention is characterized by comprising about 0.05 to 10 wt % cerium oxide powder having a BET specific surface area of not less than 80 m$^2$/g and a pH value for a 3 wt % aqueous dispersion thereof of about pH 2 to 5.5. Here, the term "cerium oxide powder" means powder made from a compound represented by the formula: CeO$_\alpha$ where $\alpha$ is about 0.2 to 2.1, including the so-called hydrated compounds with a small amount of crystallization water bound therein. The cerium oxide powder used in the present invention is such that its BET specific surface area is not less than 80 m$^2$/g, preferably, not less than 100 m$^2$/g, and even more preferably, not less than 140 m$^2$/g. In addition, the cerium oxide powder is such that the pH value of a 3 wt % aqueous dispersion thereof is within the range of from about 2 to 5.5, preferably, within the range of about 2 to 5.0, and even more preferably, within the range of about 3 to 5.0. The pH value of a 3 wt % aqueous dispersion of the cerium oxide powder is obtained by measuring with a pH meter the pH value of the supernatant obtained by subjecting 3 parts by weight of cerium oxide powder and 97 parts by weight of water to agitation for 15 minutes using a stirrer and then allowing the mixture to stand for 1 hour.

The cerium oxide powder of the present composition can be produced by contacting, for example, carbon dioxide, carbonic acid, acetic acid, formic acid, nitric acid, sulfuric acid, and phosphoric acid with ordinary calcined cerium oxide powder. Carbon dioxide, carbonic acid, and acetic acid are preferable as the acids used for acid treatment.

The composition of the present invention is a silicone rubber composition containing about 0.05 to 20 wt % of the above described treated cerium oxide powder. Well-known conventional silicone rubber compositions can be utilized as the silicone rubber composition used here. There are no particular limitations concerning its curing mechanism, which may be exemplified by organic peroxide curing, hydrosilylation reaction curing, and condensation reaction curing. Among them, the silicone rubber composition shown hereinbelow is preferable:

(A) 100 parts by weight of alkenyl-containing diorganopolysiloxane, (B) about 0.1 to 10 parts by weight cerium oxide powder having a BET specific surface area of not less than 80 m$^2$/g and a pH value of a 3 wt % aqueous dispersion thereof in a range of about pH 2 to 5.5, (C) about 5 to 150 parts by weight of a reinforcing filler, and (D) a curing agent in an amount sufficient to effect curing of the composition.

To explain the composition in greater detail, the diorganopolysiloxane of component (A) is the main component of the composition of the present invention, and usually has at least 2 silicon-bonded alkenyl groups in one molecule. The alkenyl groups are exemplified by vinyl groups, alkyl groups and hexenyl groups. The molecular structure of component (A) is substantially linear, but part of the molecular chain may have some branching. Other organic groups which can be substituted on the silicon atoms of the diorganopolysiloxane include methyl, ethyl, propyl, butyl, octyl and other alkyl groups; phenyl, tolyl, and other aryl groups; 3,3,3-trifluoropropyl, 3-chloropropyl, and other halogenated alkyl groups; and 3-cyanoalkyl groups. The diorganopolysiloxane is exemplified by dimethylpolysiloxane endblocked with dimethylvinylsiloxy groups; a copolymer of methylvinylsiloxane and dimethylsiloxane endblocked with dimethylvinylsiloxy groups; a copolymer of methylphenylsiloxane and dimethylsiloxane endblocked with dimethylvinylsiloxy groups; a copolymer of methylphenylsiloxane, methylvinylsiloxane, and dimethylsiloxane endblocked with dimethylvinylsiloxy groups; a copolymer of diphenylsiloxane and dimethylsiloxane endblocked with dimethylvinylsiloxy groups; a copolymer of diphenylsiloxane, methylvinylsiloxane, and dimethylsiloxane endblocked with dimethylvinylsiloxy groups; a copolymer of methyl(3,3,3-trifluoropropyl)siloxane and dimethylsiloxane endblocked with dimethylvinylsiloxy groups; a copolymer of methyl(3,3,3-trifluoropropyl)siloxane, methylvinylsiloxane, and dimethylsiloxane endblocked with dimethylvinylsiloxy groups; methylvinylpolysiloxane endblocked with trimethylsiloxy groups; a copolymer of methylvinylsiloxane and dimethylsiloxane endblocked with trimethylsiloxy groups; a copolymer of methylphenylsiloxane and methylvinylsiloxane endblocked with trimethylsiloxy groups; a copolymer of methylphenylsiloxane, methylvinylsiloxane, and dimethylsiloxane endblocked with trimethylsiloxy groups; a copolymer of diphenylsiloxane and methylvinylsiloxane endblocked with trimethylsiloxy groups; a copolymer of diphenylsiloxane, methylvinylsiloxane, and dimethylsiloxane endblocked with trimethylsiloxy groups; a copolymer of methyl(3,3,3-trifluoropropyl)siloxane and methylvinylsiloxane endblocked with trimethylsiloxy groups; a copolymer of methyl(3,3,3-trifluoropropyl)siloxane, methylvinylsiloxane, and dimethylsiloxane endblocked with trimethylsiloxy groups. The degree of polymerization of component (A) is usually in the range of from 100 to 15,000.

The cerium oxide powder of component (B) is such that its BET specific surface area is not less than 80 $m^2/g$ and the pH value of a 3 wt % aqueous dispersion of the cerium oxide powder is in the range of from about 2 to 5.5. Component (B) is the same cerium oxide powder as the cerium oxide powder as previously described.

The reinforcing filler of component (C) is a material that improves the mechanical strength of the silicone rubber, and is exemplified by silica micropowders, such as fumed silica, precipitated silica, and hydrophobic silica whose surface has been treated with hexamethyldisilazane; methyltrichlorosilane, methyldichlorosilane, diphenylsilane diol and other silanes; dimethylsiloxane oligomer, dimethylsiloxane/methylphenylsiloxane copolymer oligomer and other organosiloxane oligomers; by carbon black, and by colloidal calcium carbonate.

The curing agent of component (D) is represented by organic peroxides, as well as by materials in which platinum catalysts and organopolysiloxanes containing silicon-bonded hydrogen atoms are used in combination. The well-known conventional organic peroxides used for curing silicone rubber compositions can be used as the organic peroxides above. Such organic peroxides are exemplified by orthomethylbenzoyl peroxide, metamethylbenzoyl peroxide, benzoyl peroxide, dicumyl peroxide, cumyl-t-butyl peroxide, and 2,5-dimethyl-2,5-di-t-butyl peroxide, di-t-butyl peroxide. These organic peroxides can be used singly, or as mixtures of two or more peroxides. The amount of this component is within the range of from about 0.05 to 15 parts by weight, and, preferably, within the range of from about 0.05 to 5 parts by weight, per 100 parts by weight of component (A).

When platinum catalysts and organopolysiloxanes containing silicon-bonded hydrogen atoms are used in combination, the platinum catalysts are exemplified by chloroplatinic acid, platinum/olefin complexes, and chloroplatinic acid/divinyltetramethyldisiloxane complex. The amount of the platinum catalyst is, preferably, an amount such that, with respect to component (A), in terms of platinum metal, it is within the range of from 1 to 1,000 ppm by weight. In addition, the organopolysiloxanes containing silicon-bonded hydrogen atoms act as cross-linking agents in the presence of the aforementioned platinum catalysts, and need to have at least two silicon-bonded hydrogen atoms in one molecule. Such organopolysiloxanes containing silicon-bonded hydrogen atoms are exemplified by methyl-hydrogenpolysiloxane endblocked with trimethylsiloxy groups at both terminals, a copolymer of methylhydrogensiloxane and dimethylsiloxane endblocked with trimethylsiloxy groups at both terminals, dimethylpolysiloxane endblocked with dimethylhydrogensiloxy groups at both terminals, and a copolymer of methylhydrogensiloxane and dimethylsiloxane endblocked with dimethylhydrogensiloxy groups at both terminals. The amount of this component is preferable such that the ratio of the number moles of alkenyl groups in component (A) to the number of moles of silicon-bonded hydrogen atoms in this component is within a range of from 1:0.5 to 1:4.0.

The silicone rubber composition of the present invention consists of the above described components (A) through (D); however, in addition to them, it is possible to add various additives known to be normally compounded with silicone rubber compositions so long as this is not detrimental to the object of the present invention. Such additives are exemplified, by quartz micropowder, diatomaceous earth, mica, clay, glass beads, aluminum oxide, and other extending fillers; zinc oxide, iron oxide, zinc carbonate, manganese carbonate, carbon black, rouge, and other pigments, flame retardants, and agents improving heat resistance; and addition reaction retarding agents.

The silicone rubber composition of the present invention during the stage of silicone rubber composition preparation allows for suppressing the increase in the viscosity of the silicone rubber base compound and gelling, and is superior in terms of the storage stability of the silicone rubber base compound. In addition, upon curing, it is capable of producing silicone rubber moldings of superior heat resistance exhibiting a low degree of thermal degradation under high-temperature conditions exceeding 200° C. Therefore, it is suitable for applications requiring such characteristics, for example, rubber used under high-temperature conditions, such as rubber parts used in the vicinity of automobile engines, rubber used for the fixing rolls and pressure rolls of electrophotographic copiers, and rubber used for electrical wire coating.

Hereinbelow, the present invention is explained in detail by referring to application examples. In the application examples, the pH value of the 3 wt % aqueous dispersion of cerium oxide powder was determined in the following manner: 3 g of cerium oxide powder and 97 g of water were placed in a vessel, the vessel was closed with a lid and the mixture was subjected to agitation for 15 minutes using a stirrer, and then the mixture was allowed to stand 1 hour. The water used here was obtained by boiling pure water (ion exchange water) and allowing it to stand until it reached room temperature. Subsequently, the pH value of the supernatant of the resultant 3 wt % aqueous dispersion of cerium oxide powder was determined using a pH meter.

Testing of storage stability of silicone rubber base compound: A 1-L round metal can was filled with silicone rubber base compound and hermetically closed. The can filled with the silicone rubber base compound was heated for 3 days in a heating oven at a temperature of 70° C. Subsequently, the silicone rubber base compound that had undergone heating was subjected to kneading for 3 minutes using two 6-inch rollers at a rotational speed of 20 rpm and 28 rpm, with a roller gap of 3 mm. The silicone rubber base compound that had undergone kneading was taken off the rollers in the form of a sheet, whose surface smoothness was evaluated with the naked eye. The results of the evaluation were represented in the following manner.

Symbol O: The surface was smooth.

Symbol X: The surface was rippled, with ridges and valleys, the silicone rubber base compound had undergone partial gelling.

Testing of heat resistance of silicone rubber: A die used for sheet-molding was filled with silicone rubber composition and a sheet with a thickness of 2 mm was fabricated by subjecting the composition to compression molding at 170° C. for 10 minutes. Subsequently, the sheet was placed in a heating oven at 200° C. and curing was completed by heating for 4 hours.

The hardness and tensile strength of the resultant silicone rubber sheet were measured. The sheet was additionally heated for 72 hours in an oven at 250° C. After that, the hardness and tensile strength of the sheet that had undergone the additional heat treatment were measured, and the proportions of change in, respectively, the hardness and tensile strength values obtained prior to the above described heating and after the additional heating were calculated. In addition, the proportions of change were calculated in the following manner:

Change in hardness=hardness of sheet after heating–hardness of sheet prior to heating.

Residual tensile strength (%)={(tensile strength prior to heating–tensile strength after heating)/tensile strength prior to heating}×100.

Residual elongation (%)={(tensile elongation prior to heating–tensile elongation after heating)/tensile elongation prior to heating}×100.

Hardness was measured in accordance with the method recorded in JIS K 6253 (Type A durometer) and the tensile strength and elongation were measured in accordance with the method specified in JIS K 6251.

REFERENCE EXAMPLE 1

The pH value of a 3 wt % aqueous dispersion of cerium oxide powder (called cerium oxide powder (A) hereinbelow), which consisted of calcined cerium oxide obtained from cerium carbonate and having a BET specific surface area of 165 $m^2/g$ was pH 5.8. A small amount of pure water (ion exchange water) was added to the cerium oxide powder and carbon dioxide gas was blown into the cerium oxide powder in the wetted state. When the pH value of a 3 wt % aqueous dispersion of the resultant acid-treated cerium oxide powder (called cerium oxide powder (F) hereinbelow) was measured, the value was 3.8.

REFERENCE EXAMPLE 2

The pH value of a 3 wt % aqueous dispersion of cerium oxide powder (called cerium oxide powder (B) hereinbelow), which consisted of calcined cerium oxide obtained from cerium carbonate and having a BET specific surface area of 148 $m^2/g$ was pH 5.8. A small amount of pure water (ion exchange water) was added to the cerium oxide powder and carbon dioxide gas was blown in the cerium oxide powder in the wetted state. When the pH value of a 3 wt % aqueous dispersion of the resultant acid-treated cerium oxide powder (called cerium oxide powder (G) hereinbelow) was measured, the value was pH 3.8.

APPLICATION EXAMPLE 1

100 Parts by weight of a dimethylsiloxane·methylvinylsiloxane copolymer (degree of polymerization: 6,000) with both terminals endblocked with dimethylvinylsiloxy groups, having 99.8 mol % dimethylsiloxane units and 0.13 mol % methylvinylsiloxane units, 40 parts by weight of fumed silica powder with a BET specific surface area of 200 $m^2/g$, and, as a plasticizer, 10 parts by weight of dimethylsiloxane oligomer endblocked with silanol with a viscosity of 30 mPa·s were charged in a kneader mixer and kneaded to homogeneity. Subsequently, a silicone rubber base compound was prepared by kneading at 175° C. for 60 minutes. 1.5 parts by weight of cerium oxide powder (F) obtained in Reference Example 1, for which the pH value of a 3 wt % aqueous dispersion was 3.8, was added to 100 parts by weight of this silicone rubber base compound and mixed to homogeneity using a 2-roll mill thereby preparing a silicone rubber base compound. The storage stability of the silicone rubber base compound was examined. Subsequently, 0.8 parts by weight of a 50 wt % silicone oil paste of 2,5-dimethyl-2,5-di-(t-butylperoxy) hexane was added to 100 parts by weight of the silicone rubber base compound and a silicone rubber composition was prepared by kneading the mixture to homogeneity. The heat resistance of the silicone rubber composition was tested. The results are shown in Table 1 hereinbelow.

APPLICATION EXAMPLE 2

A silicone rubber base compound and a silicone rubber composition were prepared in the same manner as in Application Example 1, except that cerium oxide powder (G) obtained in Reference Example 2 was added in Application Example 1 instead of cerium oxide powder (F). The storage stability of the silicone rubber base compound and the heat resistance of the silicone rubber composition were measured in the same manner as in Application Example 1. The results of the measurements are shown in Table 1 hereinbelow.

COMPARATIVE EXAMPLE 1

A silicone rubber base compound was prepared, and, subsequently, a silicone rubber composition was prepared in the same manner as in Application Example 1, except that cerium oxide powder (A) used in Reference Example 1 was added in Application Example 1 instead of cerium oxide powder (F) obtained in Reference Example 1. The storage stability of the silicone rubber base compound and the heat resistance of the silicone rubber composition were measured in the same manner as in Application Example 1. The results of the measurements are also shown in Table 1 hereinbelow.

COMPARATIVE EXAMPLE 2

A silicone rubber base compound was prepared, and, subsequently, a silicone rubber composition was prepared in the same manner as in Application Example 2, except that cerium oxide powder (B) used in Reference Example 2 was added in Application Example 2 instead of cerium oxide powder (G) obtained in Reference Example 1. The storage stability of the silicone rubber base compound and the heat resistance of the silicone rubber composition were measured in the same manner as in Application Example 1. The results of the measurements are also shown in Table 1 hereinbelow.

TABLE 1

| | Application Example 1 | Application Example 2 | Comparative Example 1 | Comparative Example 2 |
|---|---|---|---|---|
| Storage stability of silicone rubber base compound | O | O | X | X |
| Changes in hardness of silicone rubber | 5 | 5 | 5 | 7 |
| Residual strength (%) of silicone rubber | 65 | 63 | 65 | 60 |
| Residual elongation (%) of silicone rubber | 58 | 55 | 58 | 52 |

We claim:

1. A silicone rubber composition comprising about 0.05 to 10 wt % cerium oxide powder having a BET specific surface area of not less than 80 $m^2/g$ and a pH value of a 3 wt % aqueous dispersion thereof of about pH 2 to 5.5.

2. The silicone rubber composition according to claim 1, where the pH of the aqueous dispersion is within a range of about 2 to 5.

3. The silicone rubber composition according to claim 1, where the pH of the aqueous dispersion is within a range of about 3 to 5.

4. The silicone rubber composition according to claim 1, where the BET specific surface area is not less than 100 $m^2/g$.

5. The silicone rubber composition according to claim 1, where the BET specific surface area is not less than 140 $m^2/g$.

6. A silicone rubber composition comprising
   (A) 100 parts by weight alkenyl-containing diorganopolysiloxane,
   (B) about 0.1 to 10 parts by weight cerium oxide powder having a BET specific surface area not less than 80 $m^2/g$ and a pH value of a 3 wt % aqueous dispersion thereof of about 2 to 5.5,
   (C) about 5 to 150 parts by weight of a reinforcing filler, and
   (D) a curing agent in an amount sufficient to effect curing of the composition.

7. The silicone rubber composition according to claim 6, in which component (D) is an organic peroxide.

8. The silicone rubber composition according to claim 6, in which component (D) is a combination of a platinum catalyst and organopolysiloxanes containing silicon-bonded hydrogen atoms.

9. The silicone rubber composition according to claim 6, where the pH of the aqueous dispersion is within a range of about 2 to 5.

10. The silicone rubber composition according to claim 6, where the pH of the aqueous dispersion is within a range of about 3 to 5.

11. The silicone rubber composition according to claim 6, where the BET specific surface area is not less than 100 $m^2/g$.

12. The silicone rubber composition according to claim 6, where the BET specific surface area is not less than 140 $m^2/g$.

13. A silicone rubber composition comprising
   (A) 100 parts by weight alkenyl-containing diorganopolysiloxane,
   (B) about 0.1 to 10 parts by weight cerium oxide powder having a BET specific surface area not less than 140 $m^2/g$ and a pH value of a 3 wt % aqueous dispersion thereof of about pH 3 to 5,
   (C) about 5 to 150 parts by weight of fumed silica, and
   (D) an organic peroxide in an amount sufficient to effect curing of the composition.

* * * * *